Patented Mar. 23, 1954

2,673,172

UNITED STATES PATENT OFFICE 2,673,172

FUNGICIDAL 1,2,3,4,7,7-HEXACHLORO-5-(AMINOPHENYL)-BICYCLO-[2.2.1]-2-HEPTENE

Percy B. Polen, Morton Kleiman, and Henry G. Fechter, Chicago, Ill., assignors to Arvey Corporation, a corporation of Illinois No Drawing. Application November 25, 1952, Serial No. 322,560

5 Claims. (Cl. 167—30)

This invention relates to new compositions of matter. More specifically, the present invention relates to 1,2,3,4,7,7-hexachloro-5-(aminophenyl)-bicyclo-[2.2.1]-2-heptene.

The compounds of the present invention are important and valuable because of their pesticidal characteristics, especially those relating to the killing of and inhibition of growth of a wide variety of fungi.

The need for efficient and economical fungicidal and fungistatal compositions in the fields of agriculture, paper making, clothing, adhesives, leather goods, optics (especially in tropical climates), surface coating agents, cosmetics, wood products, etc., is very great, and while various organic fungicides and fungistats are known and utilized, such materials are generally deficient in the various concomitant characteristics necessary for satisfactory, economic commercial usage.

The use of fungicides in agriculture, both in the growing stage and in the storage stage is very important. The destruction of various food crops by fungus growths can be measured in the millions of dollars annually. Since fungi are themselves a low order of plant life it is not unusual or surprising that a material which will control the growth of, or kill fungi will also adversely affect the growing or stored crops which are the host plants. A fungicide which destroys the crop at the same time that it destroys the fungus has no value for such use even though its fungicidal activity is relatively great. It is therefore important that agricultural fungicides exhibit no phytotoxicity under the conditions utilized for fungus control, and such is the case with the present compounds.

Not only is it desirable that a fungicidal composition exhibit low phytotoxicity but it must also be relatively nontoxic to warm blooded animals, including humans. Obviously, crops which are to be used for human consumption or forage for animals cannot be contaminated by materials harmful to animal life. Similarly, fabrics and other articles which are subject to fungus attack cannot be treated with fungicides which are toxic to warm blooded animals on contact. The many organic fungicides containing heavy metal substituents are usually deficient in this regard and consequently their use is limited. Thus, fungicides containing mercury, lead, arsenic, antimony, copper, and the like, are not only toxic, but have a tendency to build up in the body, thereby enhancing any toxic effect. The compounds of the present invention contain no metal substituents and circumvent the difficulties arising thereby.

It is further important that commercial fungicides be economically made and distributed and preparable from readily obtainable inexpensive raw materials.

It is one object of the present invention to produce fungicidal and fungistatal material having a high degree of activity by economic means.

It is another object of the present invention to produce fungicides suitable for use in agriculture, which contain no poisonous metallic substituents.

Another object is to produce fungicidal material which is neither toxic to warm blooded animals nor phytotoxic, thereby insuring a wide range of applicability in all fields.

These and other objects of the present invention will be apparent from the following specification.

The products of the present invention may be prepared by reacting hexachlorocyclopentadiene with styrene to form the Diels-Alder adduct of said reactants, nitrating said adduct to form the mono-nitro derivative thereof, and then reducing the nitro substituent to result in an amino compound.

Alternatively, nitro styrene can be reacted with hexachlorocyclopentadiene to form the Diels-Alder adduct, followed by reduction of the nitro substituent in said adduct to the amine.

There are three possible positional isomers which may be prepared, namely, 1,2,3,4,7,7-hexachloro-5-(p-aminophenyl)-bicyclo-[2.2.1]-2-heptene; 1,2,3,4,7,7-hexachloro-5-(m-aminophenyl)-bicyclo-[2.2.1]-2-heptene; and 1,2,3,4,7,7-hexachloro-5-(o-aminophenyl)-bicyclo-[2.2.1]-2-heptene. The nitration of hexachlorocyclopentadiene-styrene adduct, followed by reduction to the amine gives a mixture of isomers with the para isomer being preponderant. If desired, a single isomer may be isolated by recrystallization of the mixture; or, a single isomer of the final product may be formed by reacting a single isomer of nitro styrene with hexachlorocyclopentadiene and reducing the thus formed adduct in accordance with the alternative method above stated. For example, the metaamino isomer of the desired product may be prepared in pure form by reacting meta-nitro styrene with hexachlorocyclopentadiene and reducing the adduct formed to the amine. The mixture of isomers as it is formed by nitrating and reducing the adduct of hexachlorocyclopentadiene and styrene can be used without isolation of any of the individual isomers.

The nitration of 1,2,3,4,7,7-hexachloro-5- phenyl-bicyclo-[2.2.1]-2-heptene can be accomplished with nitric acid in the presence of sulfuric acid. Fuming nitric acid in acetic acid may also be used. The reaction proceeds rather quickly and temperatures below about 60° C. are preferred.

The reduction of 1,2,3,4,7,7-hexachloro-5-(nitrophenyl)-bicyclo-[2.2.1]-2-heptene to the corresponding amine can also be accomplished in various ways including the use of hydrogen gas under moderate pressure (10–15 p. s. i.) in conjunction with a catalyst such as Raney Nickel or platinum. Metal reducing agents may also be used. Stannous chloride in hydrochloric acid and iron in hydrochloric acid are effective reagents.

The introduction of a nitro group into a phenyl substituent and the reduction of such group to an amino group can be effected by a variety of means. Specific methods for such nitration and reduction are shown in the subsequent examples.

EXAMPLE I

*Preparation of 1,2,3,4,7,7-hexachloro-5-phenyl-bicyclo-[2.2.1]-2-heptene*

Into a 500 ml., 3-necked flask equipped with a reflux condenser, stirrer, and dropping funnel was placed 1-mole (272.8 g.) hexachlorocyclopentadiene. One mole of styrene (104.1 g.) was added below the surface of the stirred liquid maintained at 165° C. over a one hour period. Heating at 165–170° C. was continued for two hours after addition was complete. The contents of the flask were then cooled to 100° C. and dissolved in one liter of methanol. Upon cooling the methanol solution, two crops of crystals weighing 266 and 65 grams, respectively, were recovered. The crystalline material after recrystallization from methanol melted at 73.7–74.5° C. and had the following elementary analysis:

Analysis of purified
 product _____ C, 41.23%; H, 2.22%; Cl, 56.38%
Calculated for
 $C_{13}H_8Cl_6$ _____ C, 41.42%; H, 2.14%; Cl, 56.44%

EXAMPLE II

*Preparation of 1,2,3,4,7,7-hexachloro-5-(nitrophenyl)-bicyclo-[2.2.1]-2-heptene*

Twenty-five grams (0.066 mole) of 1,2,3,4,7,7-hexachloro-5-phenyl-bicyclo-[2.2.1]-2-heptene was added to 25 ml. of concentrated sulfuric acid heated to 45° C. in a 150 ml. 3-necked flask. Five ml. of concentrated nitric acid was added dropwise over a twenty-minute period. At the end of this time the reaction mixture was cooled and the aqueous layer decanted. The residual oil was washed with water and crystallized from ethanol. The purified material (15.5 g.) melted at 159–160° C. and had the following analysis:

Calculated for
 $C_{13}H_7Cl_6NO_2$ _____ C, 37.04%; H, 1.67%; Cl, 50.42%
Found for purified
 product _____ C, 37.27%; H, 1.78%; Cl, 50.71%

EXAMPLE III

*Preparation of 1,2,3,4,7,7-hexachloro-5-(p-amino-phenyl)-bicyclo-[2.2.1]-2-heptene*

The product prepared in Example II (0.152 mole; 64 grams) was added to a mixture containing 21 grams of powdered iron, 0.5 gram ferric chloride, 100 ml. water and 100 ml. benzene, and then heated at reflux with vigorous stirring. After one hour of heating at reflux, a positive test for ferrous ion was obtained thereby indicating the complete reduction of the nitro group to the amino group. The mixture was then extracted with benzene, washed with water, dried over anhydrous magnesium sulfate, filtered, and concentrated by evaporation. The remaining benzene was removed by addition of ethyl acetate and distillation to dryness on a steam bath in vacuo. The dry residue crystallized on standing and was further purified by recrystallization from hexane. The thus purified final product melted at 105–106° C. and had the following elementary analysis:

Analysis of pure
 product _____ C, 39.85%; H, 2.37%; Cl, 54.21%
Calculated for
 $C_{13}H_9Cl_6N$ _____ C, 39.83%; H, 2.32%; Cl, 54.28%

While Example II shows the preparation of a purified product containing a nitro group in the para position, and therefore the product of Example III is the p-amino derivative, a mixture of the isomers obtained by nitration can be reduced without purification to result in a mixture of the isomers of the amino compound.

The product of Example III can be prepared in pure form by adduction of p-nitro styrene and hexachlorocyclopentadiene followed by reduction to produce 1,2,3,4,7,7-hexachloro-5-(p-aminophenyl)-bicyclo-[2.2.1]-2-heptene without concomitant production of any other isomers, as is the case when styrene is adducted with hexachlorocyclopentadiene, followed by nitration and reduction.

Example IV shows the preparation of the meta-amino derivative, without the concomitant production of either the ortho- or the para-amino compounds, by reacting m-nitrostyrene with hexachlorocyclopentadiene followed by reduction of the adduct formed to the corresponding amine.

EXAMPLE IV

*Preparation of 1,2,3,4,7,7-hexachloro-5-(m-aminophenyl)-bicyclo-[2.2.1]-2-heptene*

Into a 100 ml., 3-necked flask equipped with reflux condenser, stirrer, and dropping funnel was placed 0.1 mole (27.28 g.) hexachlorocyclopentadiene and 0.1 g. t-butyl catechol. The material was maintained at a temperature of 125–130° C. and 0.1 mole (14.9 g.) m-nitro styrene containing 0.1 g. t-butyl catechol was added dropwise through the dropping funnel to the warm reaction mixture over a one hour period. After addition was complete the mixture was heated for an additional half hour. The reaction mixture was then dissolved in 95% ethanol, filtered, and cooled. Thirty-five grams of crystalline material, melting at 108–109° C. were recovered. Recrystallization from ethyl acetate gave a product melting at 111.5–112.0° C., having the following analysis:

Found for purified
 product _____ C, 36.28%; H, 1.78%; Cl 50.54%
Calculated for
 $C_{13}H_7Cl_6NO_2$ _____ C, 37.00%; H, 1.67%; Cl 50.42%

Reduction of the above product as described in Example II resulted in a fine crystalline material which on recrystallization from hexane resulted in substantially pure product melting at 97.8–98.5° C. and having the following analysis:

Analysis of
 pure product _____ C, 39.99%; H, 2.36%; Cl, 54.27%
Calculated for
 $C_{13}H_9Cl_6N$ _____ C, 39.83%; H, 2.32%; Cl, 54.28%

1,2,3,4,7,7 - hexachloro - 5 - (aminophenyl) - bicyclo-[2.2.1]-2-heptene is excellent fungicidal material and has important commercial utility. It is surprising that the introduction of an amino group so materially enhances the fungicidal activity of the present compounds since amino compounds are generally not good fungicides.

The absence of heavy metals such as mercury, copper or cadmium, and the absence of sulfur substituents in our material is important since these elements are usually responsible for the excessive toxicity of fungicides to warm blooded animals. These older fungicidal materials are further detrimental in that application to plant surfaces can cause burning, blotching or even destruction of the plant. These phytotoxic symptoms are virtually eliminated in the use of our new material even where concentrations on plant surfaces reach as high as 500 p. p. m.

The fungicidal material of the present invention is effective against a wide variety of plant diseases caused by fungi. Thus, the present material is effective in controlling powdery mildew, brown rot of peaches, plums, apples and other fruits, blossom blight on peaches, tomato early blight, and many others.

Table I shows the high percentage of spore inhibition obtained by using the product of Example III against *Monolinia fructicola* on glass slides. The culture was raised in 0.1% orange juice.

| Concentration of fungicide p. p. m. | Percentage inhibition |
|---|---|
| 125 | 100 |
| 63 | 100 |
| 31 | 95 |
| 16 | 96 |
| 8 | 94 |
| 4 | 91 |
| Control (spores in 0.1% orange juice) | 3 |

The ED-50 against *Monolinia fructicola* based on an average of three trials was 15.3 parts per million.

Against the tomato early blight caused by *Alternaria solani* the ED-95 for the product of Example III was 650 parts per million. This compares with zinc dimethyl dithiocarbamate, a commercial product known as "Zerlate," which under the same conditions required almost three times the amount or had an ED-95 of 1850 parts per million.

The material of the present invention may be utilized and applied as a sole active ingredient dispersed in carriers such as dusts, solvents, aqueous dispersions or other carriers frequently used in the art. In addition, the present material can be used in combination with other fungicides and insecticides.

We claim as our invention:

1. 1,2,3,4,7,7 - hexachloro - 5 - (aminophenyl) - bicyclo-[2.2.1]-2-heptene.
2. 1,2,3,4,7,7-hexachloro - 5 - (p-aminophenyl) - bicyclo-[2.2.1]-2-heptene.
3. 1,2,3,4,7,7 - hexachloro-5-(m-aminophenyl)- bicyclo-[2.2.1]-2-heptene.
4. 1,2,3,4,7,7 - hexachloro-5-(o-aminophenyl) - bicyclo-[2.2.1]-2-heptene.
5. The method of controlling fungus growths which comprises applying to fungi and their places of growth 1,2,3,4,7,7-hexachloro-5-(aminophenyl)-bicyclo-[2.2.1]-2-heptene.

PERCY B. POLEN.
MORTON KLEIMAN.
HENRY G. FECHTER.

References Cited in the file of this patent

UNITED STATES PATENTS

| Number | Name | Date |
|---|---|---|
| 2,600,691 | Ross et al. | June 17, 1952 |
| 2,606,910 | Herzfeld et al. | Aug. 12, 1952 |